United States Patent
Stull et al.

(10) Patent No.: US 7,946,443 B2
(45) Date of Patent: *May 24, 2011

(54) REMOVABLE AND REUSABLE CONTAINER CLOSURE WITH VENT

(75) Inventors: Jameson P. Stull, Far Hills, NJ (US); Robert T. Auer, East Stroudsburg, PA (US)

(73) Assignee: Stull Technologies, Inc., Somerset, NJ (US)

( * ) Notice: Subject to any disclaimer, the term of this patent is extended or adjusted under 35 U.S.C. 154(b) by 1592 days.

This patent is subject to a terminal disclaimer.

(21) Appl. No.: 11/075,788

(22) Filed: Mar. 9, 2005

(65) Prior Publication Data
US 2005/0145627 A1    Jul. 7, 2005

Related U.S. Application Data

(63) Continuation-in-part of application No. 10/810,365, filed on Mar. 26, 2004, now abandoned.

(51) Int. Cl.
*B65D 45/22* (2006.01)
*B65D 51/16* (2006.01)

(52) U.S. Cl. ............. 220/326; 220/784; 220/367.1; 215/216

(58) Field of Classification Search ............. 220/326, 220/367.1, 713, 784, 785, 786; 215/216
See application file for complete search history.

(56) References Cited

U.S. PATENT DOCUMENTS

| 247,547 A | 9/1881 | Eisemann |
| 471,911 A | 3/1892 | Sutro |
| 1,482,931 A | 2/1924 | Keehn |
| 2,205,685 A | 9/1936 | Conner |
| 2,695,806 A | 2/1953 | Balint |
| 3,421,681 A * | 1/1969 | Frank .................. 229/123.2 |
| 3,499,574 A | 3/1970 | Yates, Jr. |
| 3,642,161 A | 2/1972 | Stroud |
| 3,688,942 A | 9/1972 | Mitchell et al. |
| 3,703,975 A | 11/1972 | Wittemer |
| 3,868,041 A | 2/1975 | Knize |
| 3,885,712 A | 5/1975 | Libit ................. 222/153.14 |
| 3,964,634 A | 6/1976 | Jasinski et al. |
| 4,014,452 A | 3/1977 | Galer |
| 4,079,857 A | 3/1978 | Crisci |
| 4,119,239 A | 10/1978 | Anderson ............. 220/324 |

(Continued)

FOREIGN PATENT DOCUMENTS
WO    WO 91/02685    3/1991

*Primary Examiner* — Anthony Stashick
*Assistant Examiner* — James N Smalley
(74) *Attorney, Agent, or Firm* — Drinker Biddle & Reath LLP (57) ABSTRACT

A vented closure is provided for a container having a raised lip proximal to an upper end thereof. The closure includes a top preferably having two locking levers connected to the top with an elastically deformable hinge. The locking levers operate to releasably secure the closure to the container. The top includes a first portion and a second portion. The closure also includes a skirt. The first portion is centrally positioned in the top and the second portion is connected to the skirt. One or more vent holes are provided in the first portion. The first portion defines a first plane and the second portion defines a second plane. The first plane is displaced from the second plane.

28 Claims, 10 Drawing Sheets

U.S. PATENT DOCUMENTS

| | | | | |
|---|---|---|---|---|
| 4,209,107 | A | 6/1980 | Crisci | |
| 4,210,258 | A | 7/1980 | von Holdt | |
| 4,349,119 | A | 9/1982 | Letica | |
| 4,387,828 | A | 6/1983 | Yates, Jr. | |
| 4,480,762 | A | 11/1984 | Thomas | |
| 4,526,289 | A | 7/1985 | Schiemann | 220/304 |
| 4,579,257 | A | 4/1986 | Brandlein | 222/192 |
| 4,676,388 | A | 6/1987 | Kuboshima | 215/217 |
| 4,687,112 | A | 8/1987 | Swartzbaugh | |
| 4,718,571 | A | 1/1988 | Bordner | |
| 4,752,014 | A | 6/1988 | House et al. | 215/216 |
| 4,949,865 | A | 8/1990 | Turner | 220/713 |
| 5,042,683 | A | 8/1991 | Shaw et al. | |
| 5,232,116 | A | 8/1993 | Baxter | |
| 5,275,287 | A | 1/1994 | Thompson | |
| 5,292,017 | A | 3/1994 | Reifers | |
| 5,310,981 | A | 5/1994 | Sarnoff et al. | 219/731 |
| 5,375,730 | A | 12/1994 | Bahr et al. | 220/324 |
| 5,449,077 | A | 9/1995 | Seidler | |
| 5,603,421 | A | 2/1997 | Opresco | |
| 5,706,963 | A | 1/1998 | Gargione | |
| 5,769,258 | A | 6/1998 | Harrison et al. | 220/203.1 |
| 5,839,601 | A | 11/1998 | Van Melle | |
| 5,865,330 | A | 2/1999 | Buono | |
| 5,881,907 | A | 3/1999 | Schutz | |
| 5,908,125 | A | 6/1999 | Opresco | 215/216 |
| 5,927,526 | A | 7/1999 | Herr | |
| 6,036,036 | A | 3/2000 | Bilani et al. | |
| 6,056,138 | A | 5/2000 | Chen | |
| 6,202,869 | B1 | 3/2001 | Sullivan | |
| 6,296,130 | B1 | 10/2001 | Forsyth et al. | |
| 6,325,234 | B1 * | 12/2001 | Legaspi | 220/367.1 |
| 6,364,152 | B1 | 4/2002 | Poslinski et al. | |
| 6,431,385 | B1 | 8/2002 | Palmer | 220/324 |
| 6,439,409 | B1 * | 8/2002 | Dressel et al. | 215/228 |
| 6,460,716 | B1 | 10/2002 | Wong | |
| 6,575,323 | B1 | 6/2003 | Martin et al. | |
| 6,612,450 | B1 | 9/2003 | Buono | 215/228 |
| 6,783,019 | B2 | 8/2004 | Zettle et al. | |
| 2002/0190067 | A1 * | 12/2002 | Getsy | 220/256.1 |
| 2003/0085227 | A1 | 5/2003 | Azzarello | |
| 2004/0195241 | A1 | 10/2004 | Stull et al. | |

* cited by examiner

REMOVABLE AND REUSABLE CONTAINER CLOSURE WITH VENT

CROSS-REFERENCE TO RELATED APPLICATIONS

The present application is a continuation-in-part of co-pending application Ser. No. 10/810,365 "REMOVABLE/REUSABLE CLOSURE FOR CONTAINERS" filed Mar. 26, 2004, the entire disclosure of which is incorporated herein by reference, which claimed priority from U.S. Provisional Application Ser. No. 60/511,749 for "LOCK TOP FOR A SOUP OR BEVERAGE CONTAINER" filed on Oct. 16, 2003 and Provisional Application Ser. No. 60/460,239 for "III FINGER LOCK TOP" filed on Apr. 3, 2003. The present application claims priority from both the Ser. No. 10/810,365 application and the 60/511,749 and 60/460,239 provisional applications.

FIELD OF THE INVENTION

The present invention relates generally to removable closures for containers, and more particularly, to removable and reusable vented closures for use with microwavable containers.

BACKGROUND OF THE INVENTION

It is known to provide a microwavable food container with a lid to be secured to the container during the microwave heating process. The lid functions to reduce the potential for contents of the container spilling or boiling over during the heating process.

It would be desirable to provide a lid having features which further reduce potential spilling or boiling over of the container contents during the microwave heating process.

SUMMARY OF THE INVENTION

In one aspect, the invention is a closure for a container having an upper end and a lip proximate to the upper end. The closure comprises a top having a first substantially planar portion defining a first plane and a second substantially planar portion defining a second plane. The first plane is displaced from the second plane such that the first and second portions are offset from one another. At least one vent hole is located in the first portion. At least one locking lever is provided and includes an inwardly projecting locking wedge. An elastically deformable hinge connects the locking lever to the top. The hinge permits pivotal movement of the locking lever between a latched position and an unlatched position. A skirt is connected to the top and has an upper edge and a lower edge. The first plane is preferably near the upper edge and the second plane is intermediate the upper edge and the lower edge. The first and second portions are concentric, with the second portion surrounding the first portion and an outer extent of the second portion being connected to the skirt. The locking wedge is adapted to releasably engage the container lip in the latched position and disengage the container lip in the unlatched position.

BRIEF DESCRIPTION OF THE DRAWINGS

For the purpose of illustrating the invention, there is shown in the drawings forms that are presently preferred; it being understood, however, that this invention is not limited to the precise arrangements and constructions particularly shown.

DETAILED DESCRIPTION OF THE DRAWINGS

Figure 1:
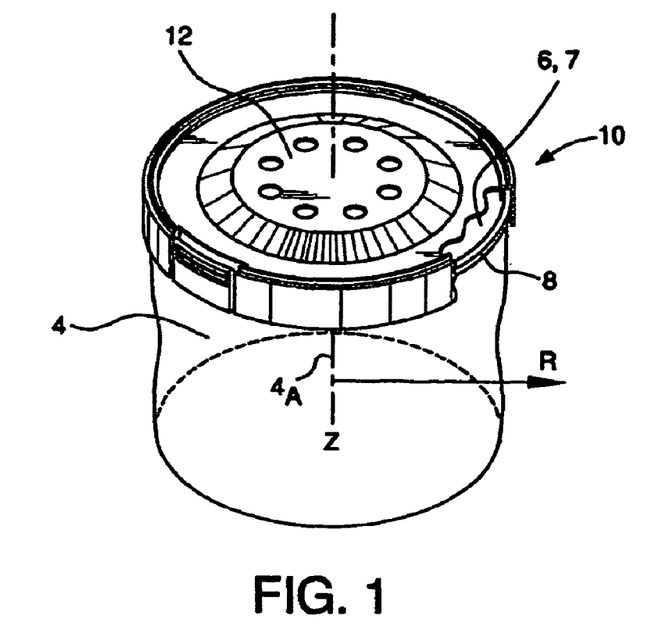
FIG. 1 is a perspective view of a container closure according to a first preferred embodiment of the present invention, shown installed on a container.

Referring now to the drawings wherein like reference numerals identify like elements, components and subassemblies, FIG. 1 depicts a container 4 in combination with a vented end closure 10 according to the present invention. The container 4 has an upper end 6 having an open mouth. Preferably, the open mouth is provided with a conventional frangible or removable seal 7, which may be removed by a user to expose contents (not shown) of the container 4. One example of a removable seal is a peel-off film that is sealed to the rim of other edge of the container. With the seal 7 removed, the closure 10 may be attached to the upper end 6 during heating of the container contents to reduce potential for spillage or boiling over of the contents, while allowing heated gases generated during the heating process to escape from the container.

The container 4 may be of any size or shape and may be fabricated from any one of a variety of materials. Preferably, the container 4 contains food products which are heated in a microwave oven prior to consumption. Therefore, the container 4 is preferably fabricated from a material suitable for storage of food products and for microwave use. The container 4 includes a raised lip 8, or similar structure proximate to its upper end 6. The raised lip 8 may be disposed directly adjacent the upper end 6 of the container 4 or in close proximity thereto. For example, should the container 4 employ a threaded end, the raised lip 8 may be disposed above or below the threaded connection. Furthermore, while the container 4 and closure 10 are illustrated as each having a substantially circular cross-section, it will be appreciated that the teachings of the invention are applicable to a variety of other cross-sectional shapes including, for example, elliptical or polygonal shapes. The following description and alternate embodiments of the invention are not intended to describe all closure/container combinations, but are merely illustrative of how the teachings of the present invention may be employed in the context of a variety of container configurations.

For the purposes of defining direction and/or angular orientation, it will be useful to define a cylindrical coordinate system, wherein a Z-axis is coincident with a longitudinal axis $4_A$ of the container 4. Displacement in, or spatial orientation relative to, the Z-axis is referred to as "axial" displacement or position, while displacement or spatial orientation along a radius R from the Z-axis will be referred to in terms of "radial" displacement or position. Furthermore, before discussing the functional characteristics of the various elements, it will be useful to provide a brief overview of the structural features, such as the geometry, spatial relationships and orientation, of the closure 10 according to the present invention.

Figure 2:
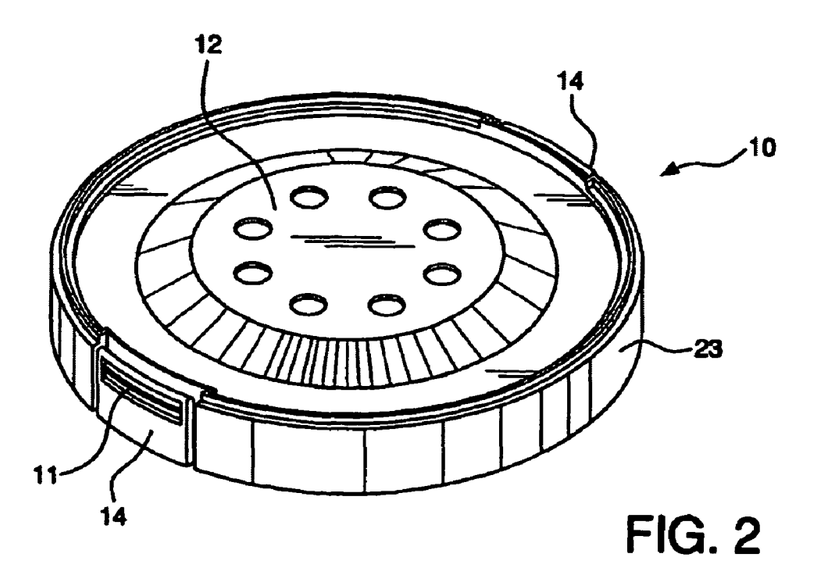
FIG. 2 is a perspective view of the closure of FIG. 1 shown removed from the container.
Figure 3:
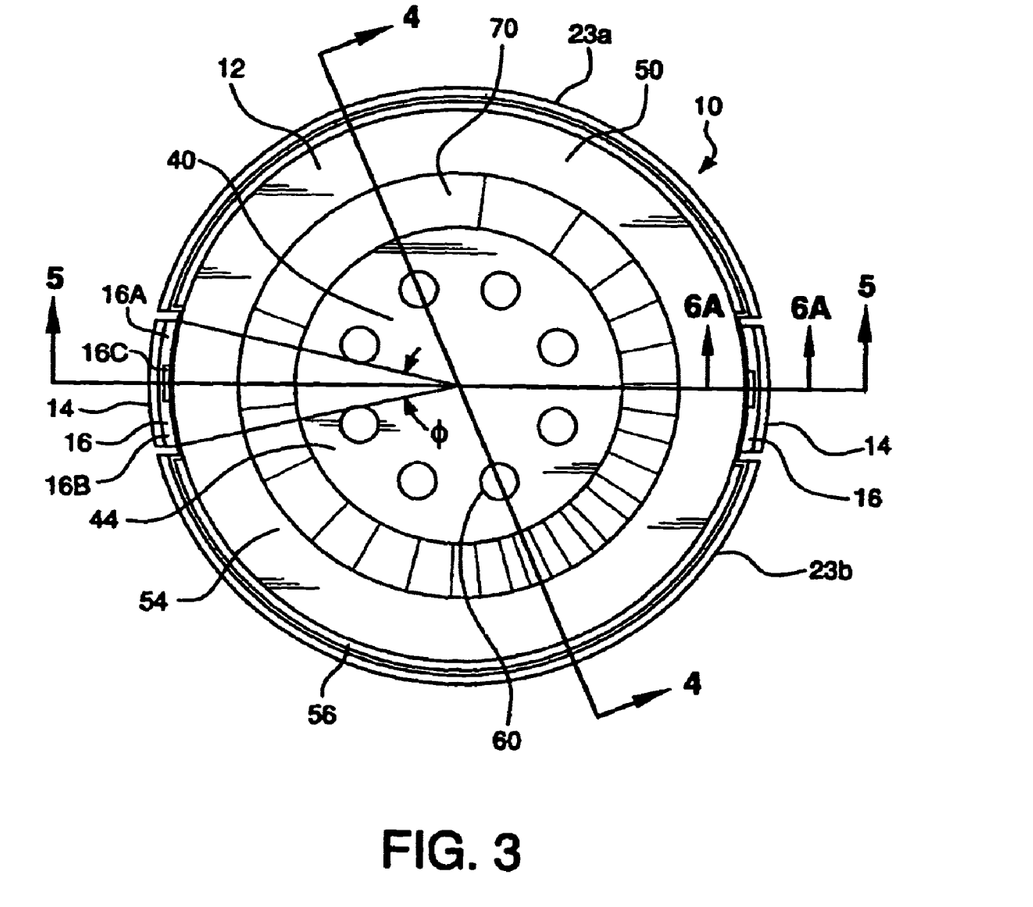
FIG. 3 is a top plan view of the closure of FIG. 1.

With reference initially to FIGS. 1-3, the closure 10 includes a top 12, at least one, and preferably two or more locking levers 14 disposed radially outboard of the top 12, and an elastically deformable hinge 16 (best seen in FIG. 3) connecting the top 12 and each of the locking levers 14. The hinge 16 preferably includes two circumferentially spaced apart webs 16A, 16B which help to stabilize the locking levers 14 for providing controlled locking of the closure to the container 4. The use of two (or more) webs for each locking lever 14 helps to dissipate or reduce the heat that passes to the locking lever 14. The webs 16A, 16B are separated by a hole or slot 16C. Providing slot 16C makes the hinge 16 more flexible, and reduces the amount of force required to move the locking levers 14. Stated otherwise, the slots 16C allow the locking levers 14 to extend through a larger arc, while reducing the amount of force required to move the locking levers 14 compared to the amount of force which would be required if the hinge 16 had a continuous web.

In the described embodiment, the top 12 includes a sealing ring 22, which provides a seal between the top 12 and the container lip 8 when the closure 10 is installed on the container 4. Alternatively, sufficient sealing between the top 12 and container lip 8 could be provided by the hinge 16 and the locking levers 14 such that the sealing ring 22 could be omitted. That is, if the locking levers 14 develop a sufficiently robust connection between the closure 10 and the container 4, an adequate seal could be realized between a lower side of the top 12 and an upper extent of the lip 8. The closure 10 preferably includes a skirt 23, preferably formed by first and second skirt segments 23a, 23b. The skirt 23 is connected to a periphery of the top 12.

Figure 4:
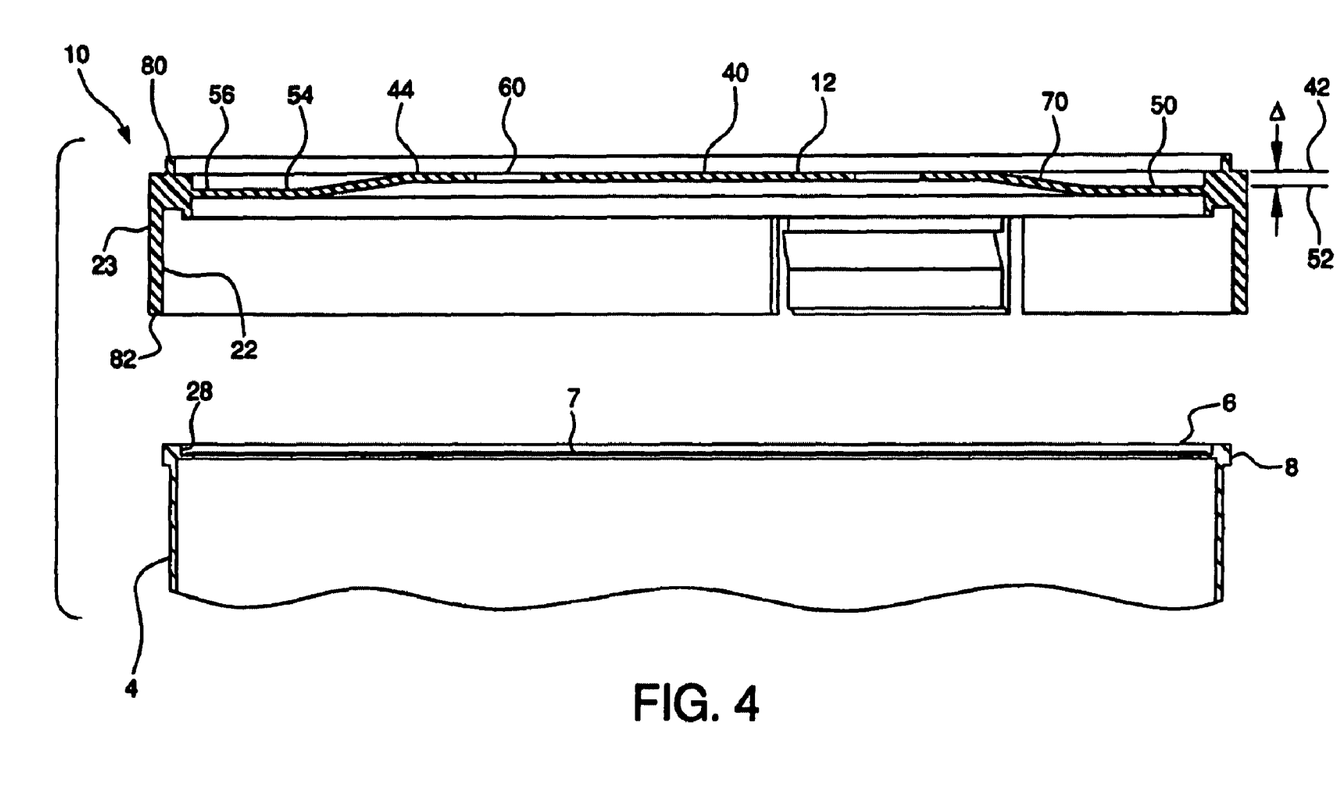
FIG. 4 is a cross-sectional view of the closure and upper portion of the container of FIG. 1, taken along line 4-4 of FIG. 3, with the closure shown separated from the container.

With particular reference to FIGS. 3 and 4, the top 12 has a first portion 40 and a second portion 50. Preferably, the first and second portions 40 and 50 are both substantially planar, defining a first plane 42 and a second plane 52, respectively. The first and second planes 42, 52 are non-coincident. Preferably, the first and second planes 42, 52 are substantially parallel, and are displaced from one another by a displacement or offset Δ (see FIG. 4). In the embodiment illustrated, the first portion 40 has an outer extent 44, and the second portion 50 has an inner extent 54 and an outer extent 56. Furthermore, in the embodiment illustrated, the first and second portions 40, 50 are concentric, with the second portion 50 surrounding the first portion 40. The second portion outer extent 56 preferably connects to the skirt 23. It should be readily apparent that, although the first and second portions are planar in the illustrated embodiment, it is contemplated that the portions may be curvilinear or other contoured shape.

A transition section 70 is preferably provided between the first and second portions 40, 50. The transition section 70 connects the first portion outer extent 44 to the second portion inner extent 54. The transition section 70 may be shaped in various ways, including a frustoconical shape as illustrated.

At least one vent hole 60, and preferably a plurality of vent holes 60 are provided in the first portion 40. The total vent area provided by the vent holes is not critical, with satisfactory performance being realized with the total vent area ranging widely, including a range from about 0.05 square inches up to about 0.50 square inches. As discussed herein below, the vent holes 60 operate to relieve gas pressure within the container 4 and closure 10 generated during the heating process.

With particular reference now to FIG. 4, the skirt 23 has a first, upper edge 80 and a second, lower edge 82. The upper edge 80 preferably defines an upper plane. As illustrated, the first plane 42 defined by the first portion 40 is preferably near the upper edge 80, while the second plane 52 defined by the second portion 50 is intermediate the upper edge 80 and lower edge 82. The first plane 42 could be substantially coincident with the upper edge 80, or could lie slightly below the upper edge 80.

Figure 6A:
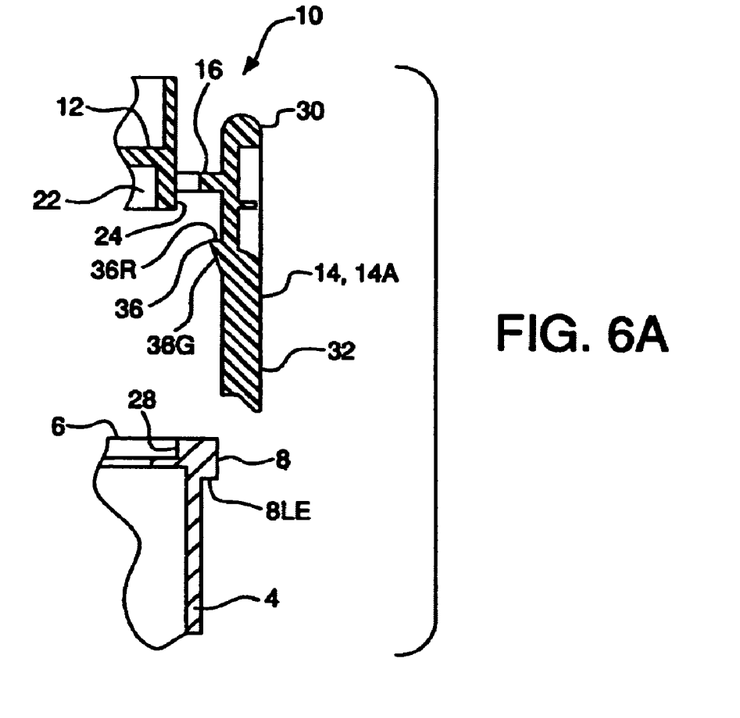
FIG. 6A is the enlarged detail view of a locking lever of the closure of FIG. 1, taken along line 6A-6A of FIG. 3, with the closure shown separated from the container and showing the locking lever rotated into a latched position.

With continued reference to FIG. 4 along with FIG. 6A, the sealing ring 22 is illustrated to have a first, upper end which connects to an underside surface of the top 12. When assembled with the container 4, the sealing ring 22 projects toward the upper end 6. A portion of the sealing ring 22 defines a sealing surface 24 adapted to detachably mate or contact with an interior surface 28 of the container lip 8. In the illustrated embodiment, the sealing surface 24 and interior surface 28 lie along substantially parallel planes. However, alternatively the contact surfaces 24, 28 could be formed to lie along planes that are at an acute angle with respect to one another to provide an interference fit and enhance sealing between the sealing surface 24 and the interior surface 28.

Figure 5:
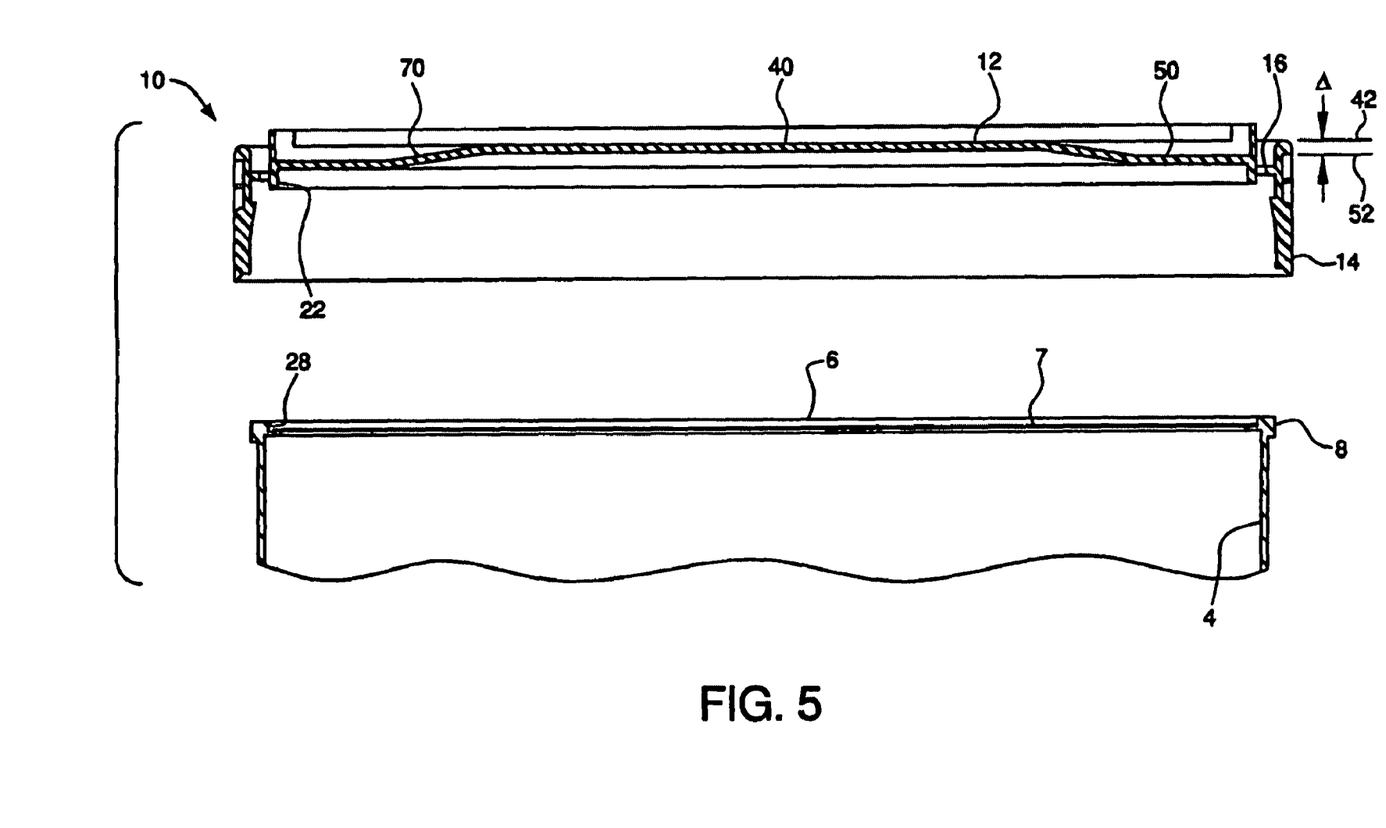
FIG. 5 is a cross-sectional view of the closure and upper portion of the container of FIG. 1, taken along line 5-5 of FIG. 3, with the closure shown separated from the container.

Referring to FIGS. 3 and 5, at least one and preferably two or more locking levers 14 are disposed about the periphery of the top 12. Preferably, if there are two levers, the levers 14 are positioned to be substantially diametrically opposed about the circumference (i.e., spaced approximately one-hundred and eighty degrees apart). However, alternatively, the levers 14 may be spaced in unequal increments depending upon the particular application.

The locking levers 14 may have any of a number of various shapes. For example the locking levers 14 may have a shape in the circumferential direction that is either linear or arcuate depending upon the desired top configuration. With reference to FIG. 3, a top view of a locking lever 14 shows the curvature or arcuate shape of the lever 14 conforming to the circumferential periphery of the skirt 23. When employed with a circular closure 10, each locking lever 14 preferably has an arc length extending over an included angle φ. The included angle φ is preferably in the range of about 10 to about 15 degrees.

Figure 6B:
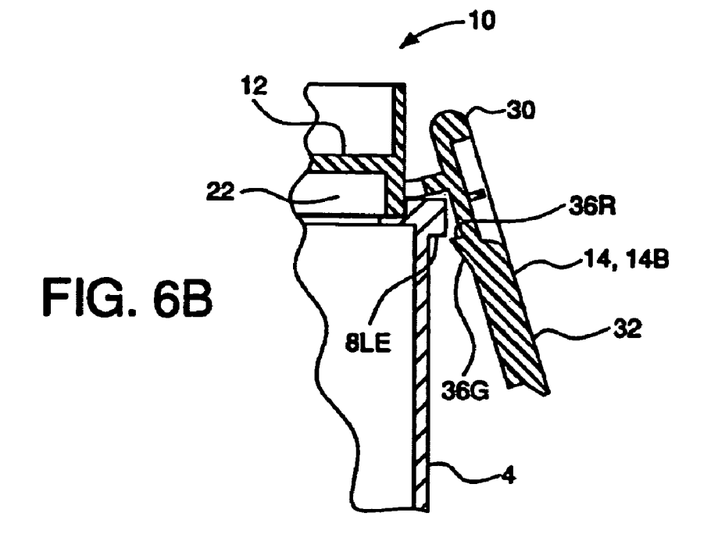
FIG. 6B is an enlarged detail view of a locking lever of FIG. 6A, with the closure shown connected to the container and showing the locking lever rotated into an unlatched position.

With reference now to FIGS. 6A and 6B, each locking lever 14 includes actuation and lower locking arms, 30 and 32, respectively. The actuation arm 30 extends in one direction (upwardly, as illustrated) from the deformable hinge 16, while the lower locking arm 32 generally extends in the opposing direction, (downwardly, as illustrated) from the hinge 16. The deformable hinge 16 is located between or intermediate the actuation and lower locking arms 30, 32 and provides a pivotal connection about which each locking lever 14 may pivot.

Each locking lever 14 includes a locking wedge 36. The wedge 36 includes a sloped guide surface 36G and a retaining surface 36R. The wedge 36 is sized, shaped, and positioned on the locking lever 14 to releaseably engage the container lip 8 when the closure 10 is installed on the container 4 and to secure the closure 10 to the container 4.

Operation of the latching levers 14 to attach the closure 10 to and to detach the closure 10 from the container 4 is now described with particular reference to FIGS. 6A and 6B. The description is applicable to the specific embodiment shown in the figures, however, the fundamentals generally apply to the alternate embodiments as well. Initially, the closure 10 of the present invention is aligned with the upper end 6 of the container 4 such that the lower locking arms 32 and sealing ring 22 are adjacent the container lip 8. The closure 10 then is pressed axially downward against the container lip 8 such that the guide surfaces 36G of the locking wedges 36 ride over an external surface of the lip 8. The deformable hinge 16 facilitates displacement of the lower locking arms 32 of the levers 14 from a latched position 14A into an unlatched position 14B, as each locking wedge 36 passes the container lip 8. More specifically, the axial displacement of the closure 10 effects radial displacement of the lower locking arms 32 until the vertex of the wedge 36 passes the lower edge 8LE of the container lip 8. Once the vertex of each wedge 36 passes the container lip 8, the inherent memory of the deformable hinge 16 causes the locking wedges 36 to displace radially inwardly, back into the latched position 14A, toward the principle Z-axis of the container 4. More specifically, the elasticity of the deformable hinge 16 rotates the levers 14 into the latched position 14A to cause the locking wedges 36 to engage the container lip 8. The guide surfaces 36G facilitate engagement of the closure 10 without the requirement to align the sealing surfaces 24, 28 or actuate the locking levers 14. That is, the guide surfaces 36G are sloped downward and away from the lower locking arm 32 to facilitate self-actuation of the locking lever 14. Thus, engagement of the closure 10 to the container 4 may be performed by one hand.

Disengagement of the closure 10 is effected by pressing the actuation arms 30 of the locking levers 14 radially inwardly to pivot the lower locking arms 32 into the unlatched position 14B. The radially inward displacement of the actuation arms 30 causes the locking arms 32 to disengage from the container lip 8. Movement of the levers 14 into the unlatched position 14B can generally be performed with the thumb and forefinger of the same hand, while the container 4 is held in the other hand. With the locking wedges 14 disengaged from the container lip 8, the closure 10 may be axially separated from the container 4.

Referring again to FIG. 2, the locking levers 14 preferably include a textured surface 11, such as a series of protrusions or dimples, that provide a gripping surface for the user's fingers. The textured surface 11 assists in inhibiting the user's fingers from slipping off the levers as they actuate the levers 14.

The closure 10 is preferably manufactured as an integral, unitary structure from a polymeric material. That is, the top 12, locking levers 14, and deformable hinges 16 are preferably fabricated as a single unit to form a unitary structure. Polypropylene is a particularly preferred material. Preferably, a conventional, low-cost fabrication technique, such as injection molding, is used to fabricate the closure 10.

In use, the container 4 is preferably provided to the consumer/user with the closure 10 attached (see FIG. 1). When the user is ready to heat the contents of container 4, the user first removes the closure 10, and then removes the seal 7, creating an open mouth at the container upper end 6. The closure 10 is then re-installed on the container 4, and the assembly of the container and closure is placed in a microwave oven for heating. During the heating process, gases within the container expand. Without the vent holes 60, the gases within the container could pressurize the interior of the container 4 to such a level as to disengage the closure 10 from the container 4. Additionally, without sufficient heat dissipation, the temperature of the lid can rise, creating a potentially hazardous condition when the user attempts to remove the product form the microwave. Furthermore, with the closure 10 disengaged, the potential for boiling over or other spillage of container contents both during and after the heating process is increased. Thus, the vent holes 60 assist in maintaining engagement of the closure 10 with the container 4 during heating process. With the closure 10 engaged with the container 4, the potential for spillage or boiling over of the contents being heated is reduced.

Furthermore, locating the vent holes 60 in the first portion 40 of the top 12 also reduces potential for spillage and boiling over of the contents while being heated. With the first portion 40 displaced from and elevated above the second portion 50, the contents of the container 4 have farther to travel to reach the vent holes 60. The elevated position of the vent holes 60 reduces the probability of contents escaping through the vent holes. Also, locating the vent holes 60 centrally reduces the potential for spillage. If the vent holes 60 were positioned toward the periphery of the top 12, a relatively minor tilting of the container 4 and closure 10 would result in overflow of the contents through the vent holes 60, while with the vent holes 60 positioned centrally, a more pronounced tilting of the container 4 and closure 10 is required for the contents to overflow through the vent holes 60. Moreover, placement of the holes near the center provides a chimney effect directing the pressure and heat in a single direction and away from the actuation arms. This minimizes temperature increase in the arms.

Figure 7:
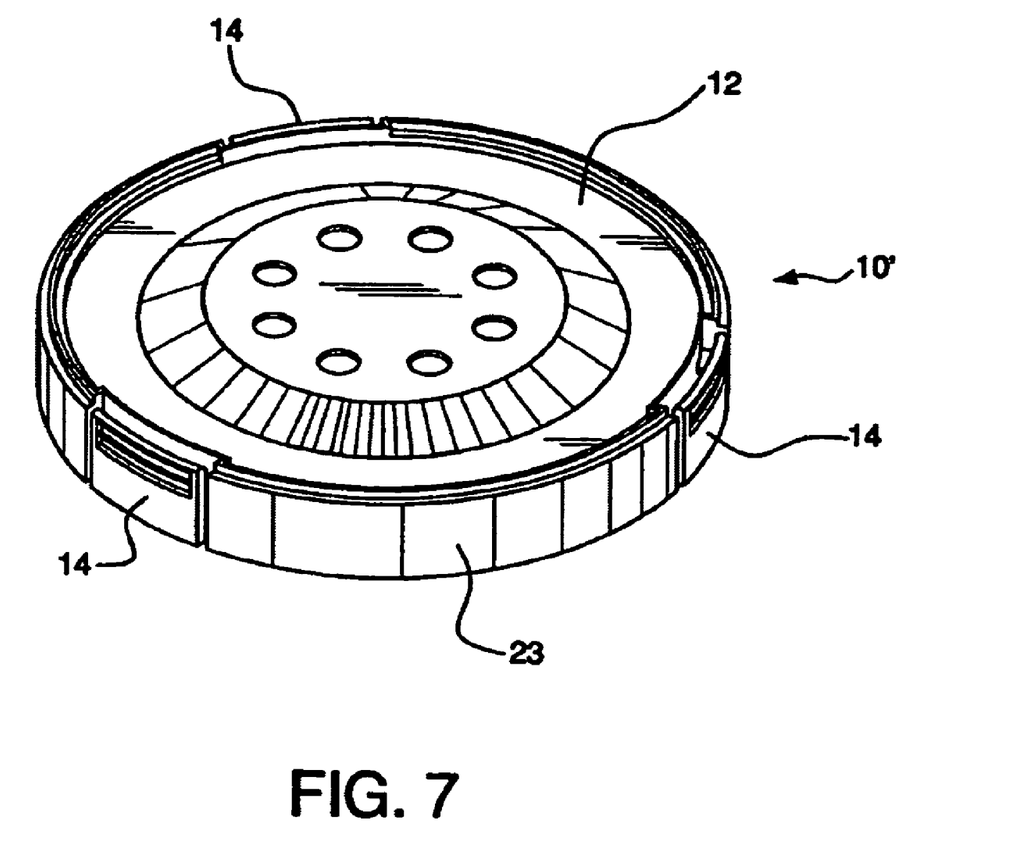
FIG. 7 is a perspective view of a closure in accordance with a second preferred embodiment of the present invention.

A second embodiment closure 10' is depicted in FIG. 7. The second embodiment closure 10' is substantially similar to the first embodiment closure 10, but comprises three (3) locking levers 14 preferably spaced at equal angular increments about the periphery of the central top 12. It will be appreciated that three fingers, working together, will be required to move the locking levers 14 from the latched position 14A to the unlatched position 14B.

The present invention thus operates to reduce the potential for spillage from the container both during and subsequent to the heating process. The locking levers 14 operate to prevent axial separation of the closure 10 from the container 4.

Figure 8:
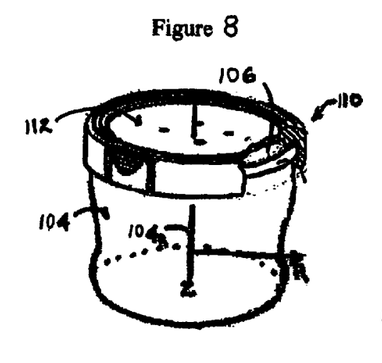
FIG. 8 is a perspective view of a container disposed in combination with an container closure according to one embodiment of the present invention.

FIG. 8 depicts a further embodiment of a container 104 in combination with an end closure 110 according to the present invention for closing an open end 106 of the container 104. The container 104 may be of any size or shape, may be used for holding any material, e.g., food or non-food product, and may be fabricated from any one of a variety of materials. The only specific requirement, however, is that the container 104 employ a raised lip 108, e.g., a rim, flange or other similar structure proximate to its open end 106. The raised lip 108 may be disposed directly adjacent the open end 106 of the container 104 or in close proximity thereto. For example, should the container 104 employ a threaded end, the raised lip 108 may be disposed above or below the threaded connection. An example of such a threaded connection will be illustrated later in the detailed description when discussing alternate embodiments. Furthermore, while the container 104 and closure 110 each have a substantially circular cross-section, it will be appreciated that the teachings of the invention are applicable to a variety of other cross-sectional shapes including, for example, elliptical, polygonal, etc. The following description and alternate embodiments of the invention are not intended to describe all closure/container combinations, but merely illustrative of how the teachings of the present invention may be employed in the context of a variety of container configurations.

For the purposes of defining direction and/or angular orientation, it will be useful to define a cylindrical coordinate system Z-R wherein the Z-axis is coincident with the longitudinal axis $104_A$ of the container 104. Displacement in, or spatial orientation relative to, the Z-axis is referred to as "axial" displacement or position, while displacement or spatial orientation along radials R from the Z-axis will be referred to in terms of "radial" displacement or position. Furthermore, before discussing the functional characteristics of the various elements, it will be useful to provide a brief overview of the structural features, such as the geometry, spatial relationships and orientation, of the closure 110 according to the present invention.

Figure 9:
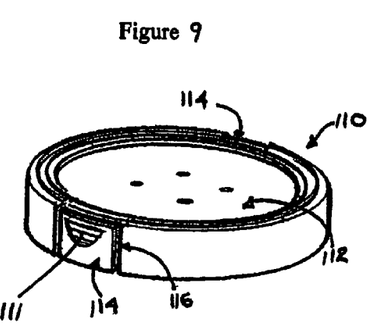
FIG. 9 is an isolated perspective view of one embodiment of the closure including a pair of locking levers disposed about the periphery of a central sealing cap.
Figure 10:
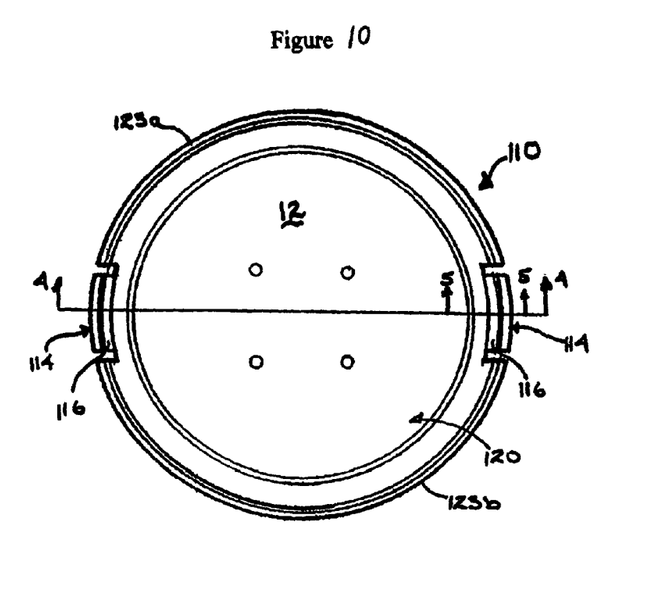
FIG. 10 is a top view of the closure shown in FIG. 9.
Figure 11:
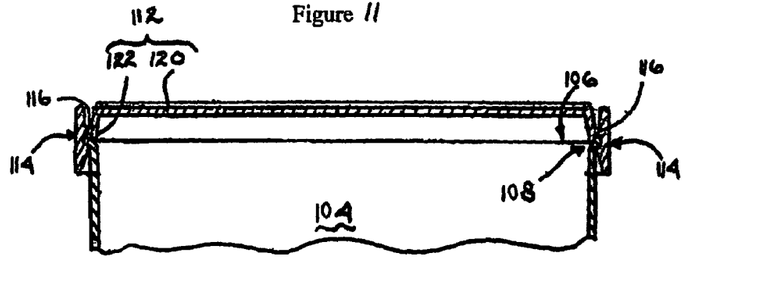
FIG. 11 is a cross-sectional view of the closure taken substantially along line 4-4 of FIG. 10.

In FIGS. 9-11, the closure 110 includes a cap 112, at least two locking levers 114 disposed radially outboard of the cap 112, and an elastically deformable hinge 116 (best seen in FIG. 11) connecting the cap 112 and each of the locking levers 114. Generally, the cap 112 may be viewed as the portion of the closure 110 which preferably provides and air- or fluid-tight seal between the container 104 and the closure 110. In the described embodiment, the cap 112 comprises a cover 120 and an annular or ring member 122, which may provide a seal between the cap 112 and lip 108 of the container. Alternatively, sufficient sealing may be provided by the hinge 116 and the locking levers 114, i.e., to the extent that an edge of the cap 112 and lip 108 of the container 104 are closely aligned. As shown, the cover 120 is solid and impervious to air and/or liquid, however, as will be seen in alternate embodiments of the invention, the cover 120 may include one or more openings for dispensing or venting the material/product within the container 104. Finally, the cap 112 may include a segmented outer ring 123a, 123b for providing an aesthetically pleasing geometric appearance.

Figure 12:
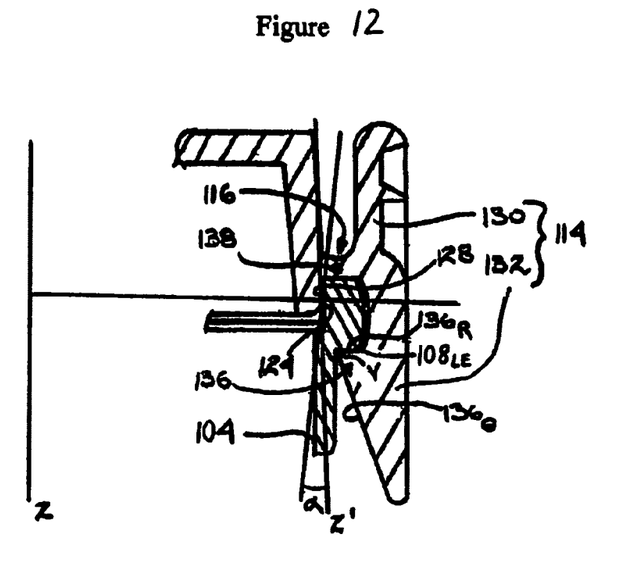
FIG. 12 is an enlarged sectional view along an edge of the closure for illustrating one of the locking levers disposed in combination with a raised lip of the container.

In FIGS. 10-12, the sealing ring 122 projects axially downwardly, i.e., toward the opening 106 of the container 104, and preferably defines a sealing surface 124 (FIG. 12) adapted to detachably mate or contact with an interior surface 128 of the container lip 108. In one embodiment, the sealing surface 124 lies along a plane that is substantially the same as the interior surface 128. In another embodiment, the contact surfaces 124, 128 lie along planes that are at an acute angle α with respect to one another so that upon placement of the cap on the container, the sealing surface 124 will come into contact with the inner surface 128 of the container 104.

In FIG. 12, each locking lever 114 includes actuation and lower locking arms, 130 and 132, respectively. The actuation arm 130 extends in one direction e.g., upwardly from the deformable hinge 116 in the figure, while the lower locking arm 132 generally extends in the opposing direction, e.g., downwardly from the hinge 116 in the figure. As such, the deformable hinge 116 lies vertically between or intermediate the actuation and lower locking arms 130, 132 and defines a fulcrum point 138 about which each locking lever 114 may pivot.

Figure 13:
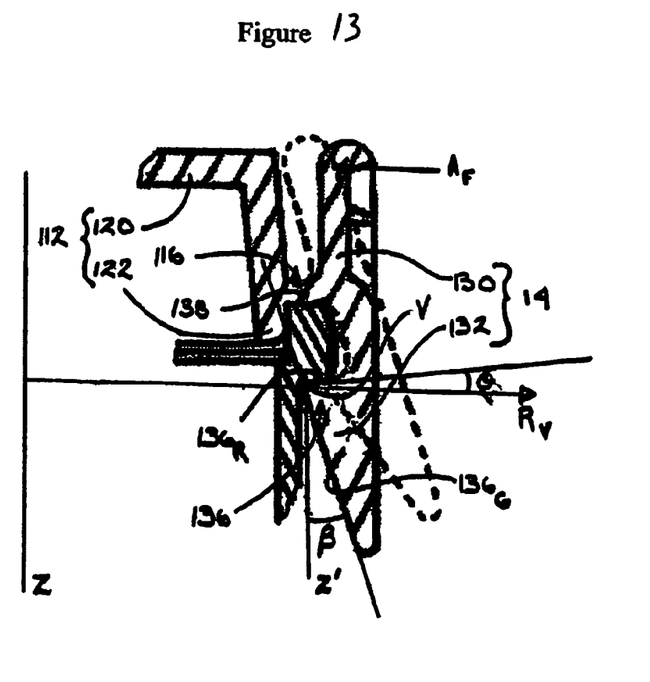
FIG. 13 is the same enlarged view of FIG. 12 illustrating the operation of the locking lever (i.e., the motion of the locking lever shown in dashed lines) and certain structural features including various angles for guiding and retaining the locking lever.

In FIGS. 12 and 13, the lower locking arm 132 includes a locking wedge 136 defining a lead angle β and a locking angle θ. The lead angle β is defined by the incline of a guide surface $136_G$ of the locking wedge 136 relative to the Z axis (or in the event that the guide surface is not linear, than the angle between the planes formed at the various points of contact on the guide surface and the Z axis. The locking angle θ is defined by the incline of a retention surface $136_R$ of the locking wedge 136 relative to the R axis. In one embodiment, the lead angle β is greater than about 8 degrees relative to the Z-axis and more preferably greater than 10 degrees. In one preferred embodiment, the lead angle lies within a range between about 11 degrees and 21 degrees. The locking angle θ is between 0 degrees to about 45 degrees relative to the radial $R_V$, although it is preferable that the angle line within a range that is greater than 0 degrees and less than 45 degrees. In one embodiment, the locking angle is between about 5 degrees to about 10 degrees.

Figure 14:
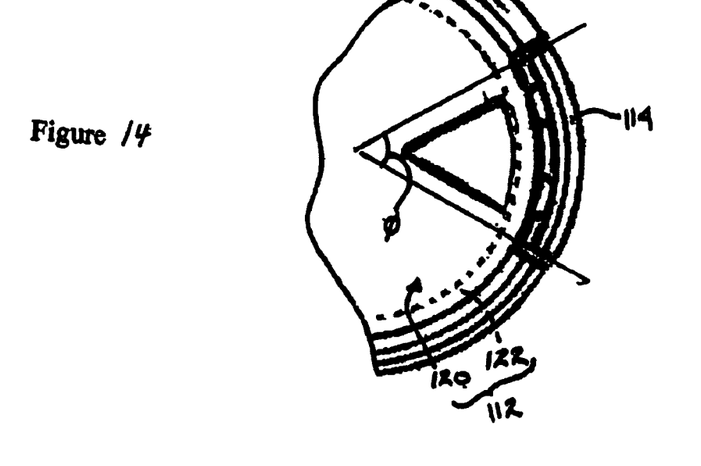
FIG. 14 depicts a top view of an arcuate section of the closure.

Referring to FIGS. 10, 13, and 14, in the illustrated embodiment, a pair of locking levers 114 are disposed about the periphery or circumference of the cap 112 (best seen in FIG. 10). Preferably, the levers 114 are spaced equiangularly about the circumference e.g., one-hundred and eighty degrees apart, however, the levers 114 may be spaced in unequal increments depending upon the particular application. As will be explained in subsequent paragraphs, more than two locking levers may be employed, however the number of locking levers 114 will, generally, not exceed a total of five.

The locking levers 114 may have any desired shape. For example the locking levers 114 may have a shape in the circumferential direction that is either linear or arcuate depending upon the desired cap configuration. In FIGS. 10 and 14, a top view of a locking lever 114 shows the curvature or arcuate shape of the lever 114 as it compliments or conforms to the periphery of the cover 120 in the circumferential direction. When employed about a circular cap 112, each locking lever 114 include locking tabs that may have an arc length corresponding to an angle φ. In one embodiment, the angle φ will be 45 degrees or less. In another embodiment, the range is between about 30 to 40 degrees. In one preferred embodiment, the angle is about 37 degrees.

The attachment and detachment of the closure 110 to the container 104 is now described with reference to FIGS. 8-14. The description is applicable to the specific embodiment shown in the figures, however, the fundamentals generally apply to the alternate embodiments as well. Initially, the closure 110 of the present invention is aligned with the opening 106 of the container 104 such that the lower locking arms 132 and ring member 122 are adjacent the container lip 108. The closure 110 then is pressed axially downwardly against the container lip 108 such that the guide surfaces $136_G$ of the locking wedges 136 ride over an external surface of the lip 108. The deformable hinge 116 facilitates displacement of the lower locking arms 132 of the levers 114 as each locking wedge 136 passes the container lip 108. More specifically, the axial displacement of the closure 110 effects radial displacement of the lower locking arms 132 until the vertex V of the wedge 136 passes the lower edge $108_{LE}$ of the container lip 108. Once the vertex V of each wedge 136 passes the container lip 108, the deformable hinge 116 causes the locking wedges 136 to displace radially inwardly, i.e. toward the principle Z-axis of the container 104. More specifically, the elasticity of the deformable hinge 116 rotates the levers 114 to cause the locking wedges 136 to engage the container lip 108.

Disengagement of the closure 110 is effected by pressing the actuation arms 130 of the locking levers 114 radially inwardly (shown in dashed lines in FIG. 13) to pivot the lower locking arms 132 about the fulcrum 138, i.e., in the direction of arrow A. As such, the radially inward displacement of the actuation arms 130 causes the locking arms 132 to disengage from the container lip 108. Generally, this can be performed with the thumb and forefinger of the same hand, while the container 104 is held in the other hand. Finally, with the locking wedges 114 disengaged from the container lip 108, the closure 110 may be axially separated from the container 104.

The closure 110 of the present invention can be configured to provide an air- or fluid-tight seal while providing a positive lock for mitigating spillage, even when the container is inadvertently mishandled. The locking levers 114 operate to prevent axial separation and are preferably designed to produce an axial bias tending to more thoroughly and effectively seal the closure 110 to the container 104. That is, the locking wedges 136 each define a shallow locking angle θ (see FIG. 13) which, when combined with the elasticity of the deformable hinge, produce a compressive force on the sealing surfaces 124, 128. More specifically, the deformable hinge biases the locking wedge 136 into engagement with the container lip 108. The radial displacement of the locking wedge 136, i.e., towards the principle Z-axis, causes the retention surface $136_R$ to produce a small axial displacement. As such, the shallow locking angle θ provides a mechanical advantage to magnify the effectiveness of the deformable hinge 116. The axial displacement produced by the retention surface $136_R$, in turn, increases the contact pressure on the mating surfaces 124, 128 and, consequently, the sealing effectiveness therebetween.

In addition to the retention surfaces $136_R$, the guide surfaces $136_G$ also facilitate engagement of the closure 110 without the requirement to align the sealing surfaces 124, 128 or actuate the locking levers 114. That is, the relatively steep lead angle β of the guide surfaces $136_G$ enables self-actuation of the locking lever 114. Thus, engagement of the closure 110 may be performed by one hand.

While the closure devices of the prior art are prone to disengage when a container is inadvertently mishandled, e.g., dropped or tightly grasped, the locking lever 114 of the inventive closure provides a positive lock to prevent detachment from the container 104. Additionally, it is preferable that the ring member 122 be configured to project or extend axially past the hinge 116 as shown in FIG. 13 to form a sealing ring. As such, the ring member 122 functions to align the closure with the lip 108 during engagement and to structurally augment the lip 108 to inhibit deformation of the lip 108. As discussed above, such deformation can lead to separation of the closure from the container 110 and spillage of the contents.

One benefit of the closure 110 shown in the illustrated embodiment is that it can be installed and removed by one hand, while the other grasps the container 104. That is, the locking levers 114 are spatially positioned to be actuated by the fingers of one hand. Preferably the size of the closure 110 is consistent with that of an average individual, i.e., commensurate with a person's hand size and finger reach.

The closure 110 of the present invention may be manufactured by conventional low-cost fabrication techniques, such as injection molding, and in the described embodiment, is manufactured from injection-molded thermoplastic. The injection molding process, preferably, employs polypropylene plastic to produce an integral structure. That is, the cap 112, locking lever 114, and deformable hinges 116 are fabricated as a unit to form an uniform structure having substantially isotropic properties.

Figure 15:
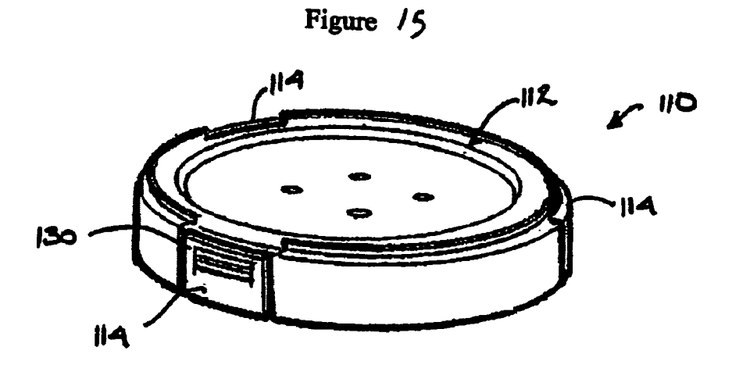
FIG. 15 is an isolated perspective view of another embodiment of the closure including three such locking levers disposed in equiangular increments about the sealing cap.
Figure 16:
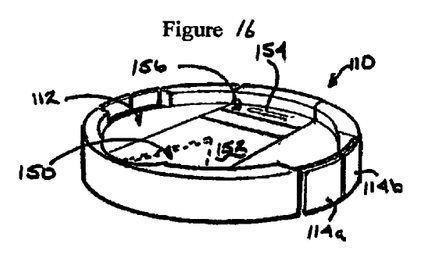
FIG. 16 is an isolated perspective view of an alternate embodiment of the closure according to the present invention including an opening for dispensing the container contents and a hinged cover plate for closing and sealing the opening.
Figure 17:
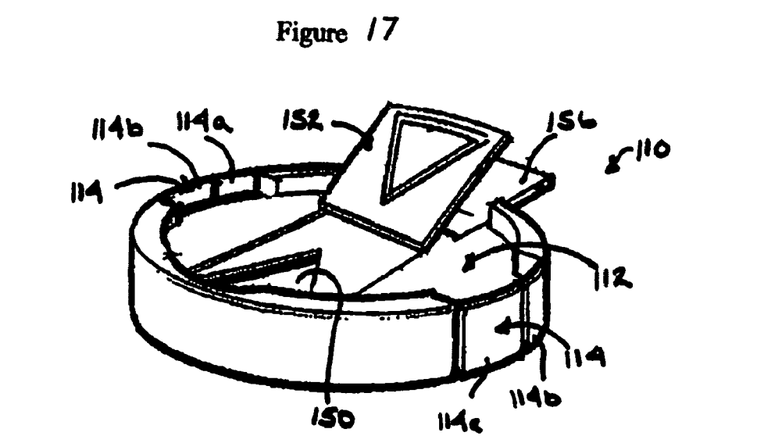
FIG. 17 is an isolated perspective view of the closure of FIG. 16 with the hinged cover plate and vent tab shown in an open position.

Various alternate embodiments of the invention are depicted in FIGS. 15 through 17. In FIG. 15, three (3) locking levers 114 are spaced equiangularly about the periphery of the central cap 112. It will be appreciated that three fingers, working together, will be required to displace the upper actuation arms 130.

In FIGS. 16 and 17, the closure 110 may include an opening 150 for dispensing the container contents. The opening 150 may be closed and sealed by a hinged cover plate 152 which may be integrally formed along the upper surface of the cap 112. While holding and dispensing a liquid, the closure 110 may include a vent 154 disposed through the cap 112 to facilitate fluid flow, i.e., to prevent a flow restricting vacuum within the container 104. Like the opening 150, a hinged vent plate 156 may be integrally formed to open and close the vent. FIG. 10 shows the hinged cover and vent plates 156. In this embodiment, the locking levers 114 are disposed on opposite sides of the hinged cover and vent plates 152, 156 so as not to interfere with cover opening 150 or vent 154. Further, to ensure that the locking levers 114 are not inadvertently actuated, a pair of locking levers 114a, 114b may be employed on each side of the opening 150.

Further, a variety of other modifications to the embodiments will be apparent to those skilled in the art from the disclosure provided herein. Thus, the present invention may be embodied in other specific forms without departing from the spirit or essential attributes thereof and, accordingly, reference should be made to the appended claims, rather than to the foregoing specification, as indicating the scope of the invention.

What is claimed is:

1. A closure for a container having an upper end and a lip proximate to the upper end, the closure comprising:
    a top having a first surface and a second surface joined by a frustoconical transition section, the first surface being located above the second surface and defining a substantially planar uppermost portion of the top surrounded by the transition section, the second surface surrounding the first surface and the transition section, the second surface having an outer edge and a substantially planar portion extending radially inwardly from the outer edge to the transition section;
    at least one vent hole located in the first surface;
    at least one locking lever including an inwardly projecting locking wedge;
    an elastically deformable hinge connecting the locking lever to the top, the hinge permitting pivotal movement of the locking lever between a latched position and an unlatched position; and
    a skirt connected to the top and having an upper edge and a lower edge, the upper edge being located above the lower edge, the outer edge of the second surface being connected to the skirt,
    wherein the locking wedge is adapted to releasably engage the container lip in the latched position and disengage the container lip in the unlatched position;
    wherein the first surface is positioned at or below the upper edge of the skirt and above the lower edge of the skirt;
    wherein the second surface has a width in the radial direction at least as large as a width of the transition section in the radial direction such that the transition section is spaced inwardly from the outer edge; and wherein an annular ring depends from the bottom of the second surface at or near the outer edge and spaced apart from the skirt.

2. The closure of claim 1 wherein the first surface lies substantially along a first plane, the first plane being at approximately the same vertical height as the upper edge of the skirt.

3. The closure of claim 1, wherein the first and second surfaces are substantially concentric, and wherein the second surface connects to the skirt at a point below the upper edge.

4. The closure of claim 1 wherein there are two locking levers on opposite sides of the top.

5. The closure of claim 1 wherein there are a plurality of vent holes located in the first surface.

6. The closure of claim 1, further comprising a sealing ring connected to a lower surface of the top, wherein with the locking wedge engaged with container lip, the sealing ring sealingly engages the container lip.

7. The closure of claim 1, further comprising a container for containing a microwavable food product, the container having a container lip, the closure being removably engaged with the container lip.

8. The closure of claim 1, wherein the hinge includes at least two webs, each web separated from each other web by a slot.

9. A closure for a container having an upper end and a lip, the closure comprising:
- a top having a substantially planar first portion and a substantially planar second portion joined by a frustoconical transition section, the second portion surrounding the transition section and the first portion and extending radially inwardly from an outer edge of the top to the transition section, the first portion defining an uppermost portion of the top;
- a sealing ring extending from a lower side of the second portion of the top, having an upper edge connected to the second portion and an unsupported lower edge;
- at least one vent hole located in the first portion;
- at least two locking levers disposed radially outward from the sealing ring and having an inwardly projecting locking wedge; and
- a deformable hinge connecting each of the locking levers to the top, each hinge permitting pivoting of each of the locking levers between a latched position and an unlatched position,
- wherein at least a portion of the sealing ring is adapted to contact at least a portion of the container lip, and the locking wedges are adapted to releasably engage the container lip with the locking lever in the latched position and the closure installed on the container; and
- wherein the second portion has a width in the radial direction at least as large as a width of the transition section in the radial direction.

10. A combination of a snap-on lid and a microwavable food container comprising:
- a microwavable food container having an upper end and a lip at the upper end, and fabricated from materials suitable for storage of food and for use in a microwave oven;
- a snap-on closure removably attachable to the container and including:
  - a top including a first planar portion and a second planar portion surrounding the first planar portion such that the first planar portion is displaced from an edge of the top, the first and second planar portions being substantially parallel to each other, the first planar portion defining an uppermost portion of the top, the first and second planar portions being joined by a frustoconical transition section;
  - a skirt having an upper edge and a lower edge;
  - at least one vent hole located in the first portion;
  - at least two locking levers, each locking lever having an inwardly projecting locking wedge; and
  - at least two deformable hinges, each separately connecting one of the locking levers to the top for pivotal movement between a latched position and an unlatched position,
- wherein the locking wedges releasably engage the container lip with the locking levers in the latched position and the closure installed on the container, and
- wherein the first portion is near the top edge and the second portion is intermediate the top edge and the lower edge; and
- wherein the second surface has a width in the radial direction at least as large as a width of the transition section in the radial direction.

11. An easily installable and removable closure for a container having an open end and a lip proximate to the open end, the closure comprising:
- a cap including a cover;
- a sealing ring extending downward from the cap;
- at least one locking lever located radially outward from the ring and including upper actuation and lower locking arms, the lower locking arm having an inwardly projecting locking wedge, the locking wedge having an inclined retention surface defining a locking angle;
- an elastically deformable hinge connecting the cap to the locking lever, the hinge located between the upper and lower arms for permitting pivoting of the locking lever and the sealing ring extending below the hinge; and
- the at least one locking lever adapted to releasably engage the container lip by radial displacement of the actuation arms to engage and disengage the locking wedge, and the sealing ring arranged to seal against the inside of the container lip and to structurally augment the lip to inhibit detachment of the locking wedge from the container lip;
- wherein the cap includes an opening for passing container contents therethrough and a hinged cover plate integrally formed in combination with the cover.

12. The closure according to claim 11 wherein there are at least two locking levers, each locking lever connected to the cap by an elastically deformable hinge.

13. The closure according to claim 12 wherein each of the locking wedges has a guide surface defining a lead angle, the lead angle being within a range of between about eight degrees to about thirty degrees, the guide surface acting in combination with a container lip to facilitate engagement of the locking wedges by radial displacement of the lower locking arm.

14. The closure according to claim 12 wherein the locking angle of each of the locking wedges is within a range of between about five degrees to about ten degrees, the retention surface of each of the locking wedges acting in combination with a container lip to urge the cap onto the container.

15. The closure according to claim 12 wherein each locking lever has a locking tab with an arcuate shape in one direction which has an inscribed angle less than about 45 degrees.

16. The closure according to claim 12 further comprising an abutment surface located radially inboard of each actuation arm for limiting the pivot motion of the respective locking lever.

17. The closure according to claim 11 wherein the cover, deformable hinge and locking levers are integrally formed from injection molded thermoplastic.

18. The closure according to claim 11 wherein the deformable hinge is segmented.

19. An easily installable and removable closure for a container having an open end and a lip proximate to the open end, the closure comprising:
a cap including a cover having one or more openings for venting the material within the container, the one or more openings being disposed in an uppermost portion of the cap;
at least one locking lever including upper actuation and lower locking arms, the lower locking arm having an inwardly projecting locking wedge;
an elastically deformable hinge connecting the cap to the locking lever, the hinge located between the upper and lower arms for permitting pivoting of the locking lever; and
a sealing ring extending downward from the cap below the hinge and inward of the at least one locking lever and arranged to support an inside of the container lip opposite the lower locking arm;
the at least one locking lever adapted to releasably engage the container lip by radial displacement of the actuation arms to engage and disengage the locking wedge;
wherein the uppermost portion of the cap is isolated from the at least one locking lever by a substantially planar annular portion of the cap that surrounds the uppermost portion and a frustoconical transition section interconnecting the uppermost portion and the annular portion, the annular portion having a width in the radial direction at least as large as a width of the transition section in the radial direction.

20. The closure according to claim 19 wherein each of the locking wedges has a guide surface defining a lead angle, the lead angle being within a range of between about eight degrees to about thirty degrees, the guide surface in combination with the container lip facilitating engagement of the locking wedges by radial displacement of the lower locking arm.

21. The closure according to claim 20 wherein each of the locking wedges has a retention surface defining a locking angle, the locking angle being within a range of between about five degrees to about ten degrees, the guide surface acting in combination with the container lip to urge the cap onto the container.

22. The closure according to claim 21 wherein the deformable hinge is segmented.

23. A closure/container combination comprising:
a container having an opening and a lip,
a closure removably attachable to the container and including:
a cap having at least one opening for venting the container, the at least one opening being disposed in an uppermost portion of the cap, the uppermost portion being isolated from an edge of the cap by a substantially planar annular portion of the cap that surrounds the uppermost portion and a frustoconical transition section interconnecting the uppermost portion and the annular portion, the annular portion having a width in the radial direction at least as large as a width of the transition section in the radial direction;
at least two locking levers, each lever including an upper actuation arm and lower locking arm, the lower locking arm having an inwardly projecting locking wedge, the locking wedge having an inclined retention surface defining a locking angle;
a deformable hinge connecting the cap to each locking lever, each hinge attaching to the upper and lower arms at an intermediate location and providing a fulcrum about which each of the locking levers can pivot; and
a sealing ring extending downwards from the cap below the hinges radially inward from the locking levers, a sealing surface of the sealing ring contacting a sealing surface on the inside of the container lip when the closure is engaged with the container and the sealing ring operative to structurally augment the container lip;
the locking levers operative to releasably engage the container lip by radial displacement of the actuation arms to engage and disengage the locking wedges from the lip.

24. The closure/container combination according to claim 23 wherein each of the locking wedges has a guide surface defining a lead angle within a range of between about eight degrees to about thirty degrees, the guide surface acting in combination with the container lip to facilitate engagement of the locking wedges by radial displacement of the lower locking arm.

25. The closure/container combination according to claim 23 wherein each of the locking wedges has a retention surface having a locking angle within a range of between about five degrees to about ten degrees, the retention surface acting in combination with the container lip to urge the cap into contact with the container.

26. A closure/container combination comprising:
a container having an opening and a lip,
a closure removably attachable to the container and including:
a cap having a cover;
at least two locking levers, each lever including an upper actuation arm and lower locking arm, the lower locking arm having an inwardly projecting locking wedge, the locking wedge having an inclined retention surface defining a locking angle;
a deformable hinge connecting the cap to each locking lever, each hinge attaching to the upper and lower arms at an intermediate location and providing a fulcrum about which each of the locking levers can pivot; and
a sealing ring extending downwards from the cap below the hinges radially inward from the locking levers, a sealing surface of the sealing ring contacting a sealing surface on the inside of the container lip when the closure is engaged with the container and the sealing ring operative to structurally augment the container lip;
the locking levers operative to releasably engage the container lip by radial displacement of the actuation arms to engage and disengage the locking wedges from the lip;
wherein the container includes an external thread located between the raised lip and the opening and wherein the cap includes a substantially cylindrical sidewall with an internal thread for engaging the external thread of the container.

27. The closure/container combination according to claim 23, wherein the closure comprises a sealing plug that fits within the rim of the container, and the sealing plug and the locking levers are operative to grip the rim between them.

28. An easily installable and removable closure/container combination comprising:
- a container having an opening and a lip,
- a closure removably attachable to the container and including:
  - a cap having a cover and a segmented outer ring, the cover having at least one opening for venting the container, the at least one opening being disposed in an uppermost portion of the cap, the uppermost portion being isolated from an edge of the cap by a substantially planar annular portion of the cap that surrounds the uppermost portion and a transition section joining the annular portion and the uppermost portion;
  - at least two locking levers, each lever including an upper actuation arm and lower locking arm, the actuation arm in a rest position forming part of the segmented outer ring, the lower locking arm having an inwardly projecting locking wedge, the locking wedge having an inclined retention surface defining a locking angle;
  - a deformable hinge connecting the cap to each locking lever, each hinge attaching to the upper and lower arms at an intermediate location and providing a fulcrum about which each of the locking levers can pivot; and
  - a sealing ring radially inward of the locking levers and extending below the hinge and arranged to sealingly engage an inside of the container opening and to structurally augment the container lip,
- the locking levers operative to releasably engage the container lip by radial displacement of the actuation arms to engage and disengage the locking wedges from the lip;
- wherein the annular portion has a width in the radial direction at least as large as a width of the transition section in the radial direction.

* * * * *